(12) United States Patent
Breitenbach et al.

(10) Patent No.: US 11,552,939 B2
(45) Date of Patent: Jan. 10, 2023

(54) METHOD FOR THE SECURE CONFIGURATION OF AUTOMATION SYSTEMS

(71) Applicant: Robert Bosch GmbH, Stuttgart (DE)

(72) Inventors: Alexander Breitenbach, Frammersbach (DE); Julien Rausch, Gemuenden (DE)

(73) Assignee: Robert Bosch GmbH, Stuttgart (DE)

(*) Notice: Subject to any disclaimer, the term of this patent is extended or adjusted under 35 U.S.C. 154(b) by 112 days.

(21) Appl. No.: 16/918,044

(22) Filed: Jul. 1, 2020

(65) Prior Publication Data
US 2021/0029106 A1 Jan. 28, 2021

(30) Foreign Application Priority Data
Jul. 24, 2019 (DE) .................... 10 2019 210 982.9

(51) Int. Cl.
| H04L 29/12 | (2006.01) |
| H04L 9/40 | (2022.01) |
| G05B 19/418 | (2006.01) |
| H04W 4/80 | (2018.01) |
| H04L 69/18 | (2022.01) |
| H04W 36/14 | (2009.01) |

(52) U.S. Cl.
CPC ...... *H04L 63/0807* (2013.01); *G05B 19/4185* (2013.01); *G05B 19/41865* (2013.01); *H04L 63/0853* (2013.01); *H04L 63/20* (2013.01); *H04L 69/18* (2013.01); *H04W 4/80* (2018.02); *H04W 36/14* (2013.01)

(58) Field of Classification Search
CPC .......... G05B 19/41865; G05B 19/4185; G05B 2219/25165; G05B 2219/31183; G05B 19/0426; H04W 4/80; H04W 36/14; H04L 29/12
See application file for complete search history.

(56) References Cited

U.S. PATENT DOCUMENTS

| 10,360,363 B1* | 7/2019 | Grasberg | G06F 16/245 |
| 2012/0023567 A1* | 1/2012 | Hammad | G06Q 20/4018 726/9 |
| 2013/0035901 A1* | 2/2013 | Breed | B60C 19/00 702/188 |
| 2013/0332727 A1* | 12/2013 | Jaudon | H04L 63/0807 713/159 |
| 2014/0090034 A1* | 3/2014 | Fyke | H04L 63/061 726/5 |
| 2017/0048198 A1* | 2/2017 | Frank | H04L 9/006 |
| 2018/0167362 A1* | 6/2018 | Glenn | H04L 63/0263 |
| 2018/0270392 A1* | 9/2018 | Araki | H04N 1/00344 |
| 2019/0068583 A1* | 2/2019 | Martinez | H04W 12/069 |
| 2019/0081927 A1* | 3/2019 | Pham | H04L 61/5014 |
| 2019/0254118 A1* | 8/2019 | Dao | H04L 67/141 |
| 2020/0127994 A1* | 4/2020 | Kukreja | G06F 21/335 |

* cited by examiner

*Primary Examiner* — Lan-Huong Truong
(74) *Attorney, Agent, or Firm* — Maginot, Moore & Beck LLP

(57) ABSTRACT

The disclosure relates to a method for configuring a control device of an automation system, comprising: detecting a local access token via an interface of the control device; and modifying at least one parameter of the control device, which is designed to configure a data connection of the control device in response to the detection of the local access token.

13 Claims, 4 Drawing Sheets ained by authenticating a token. Simply bringing a token close to the reading device of the interface is therefore not sufficient to change the configuration of the control device; additionally, the token must transmit authentication data when brought close, such as a password, a key, a unique identification number, or other verification data.

METHOD FOR THE SECURE CONFIGURATION OF AUTOMATION SYSTEMS

This application claims priority under 35 U.S.C. § 119 to application no. DE 10 2019 210 982.9, filed on Jul. 24, 2019 in Germany, the disclosure of which is incorporated herein by reference in its entirety.

TECHNICAL FIELD

The present disclosure relates to a method for configuring a control device of an automation system and to an automation system in which such a method can be applied, as well as a processing unit and a computer program for the implementation of the method.

BACKGROUND

The vast majority of plants in industrial production and manufacturing are now partly or completely automated. For this purpose, specific hardware and firmware modules are used as well as programmable controllers (e.g. PLC, programmable logic controllers) or PC-based controllers. These can perform all relevant functions, such as open-loop and closed-loop control, diagnostics and/or monitoring of automated sensors and actuators.

A machine operator does not usually encounter details of configuration and settings and therefore does not need to have the appropriate knowledge. Therefore, it is often necessary to allow external access for the maintenance or configuration of an automation system. For example, it is advantageous to have a connection to external networks available for maintenance or configuration and to provide appropriate access to the installation controller.

However, such facilities and their control devices are often secured against other modules, against the internal network and/or external networks, in order to prevent security-related intrusions. This function is provided by, for example, physically separated network segments, address spaces, firewalls, and other filter rules.

It is therefore desirable to provide a simple and secure way to configure an automation system.

SUMMARY

According to the disclosure, a method for the configuration of a control device of an automation system and an automation system having the features of the disclosure are proposed. Advantageous configurations are the subject matter of the following description.

In particular, a method is proposed for configuring a control device of an automation system, which comprises the detection of a local access token via an interface of the control device and the modification of at least one parameter of the control device, which is designed to configure a data connection of the control device, in response to the detection of the local access token. In this way, for example, a data connection of the control device from or into an external network can be enabled, or a data connection can be made accessible from the control device or connected elements to an underlying network (e.g. a field bus), meaning access restrictions are suspended.

According to a preferred embodiment, the modification may comprise changing this at least one parameter from a first value, which at least partially prevents communication between the control device and the network, to a second value (or vice versa), which at least partially enables communication between the control device and the network. In this way, the detection of the local access token temporarily enables external network access, allowing various settings, communications, and other actions to be performed over that network.

In addition, at least one data item can be received from the local token, and based on the received data item, one or more stored parameter values may be selected, which may then be used to change parameters. These may be stored in a memory element of the control device, so that a specific parameter value or a set of parameter values, such as a complete configuration template, is selected and applied based on the data received/retrieved from the access token, for example, on the basis of identification data of the access token.

Alternatively or in addition, data items can be received from the access token itself, which represent parameter values for modifying the parameters of the control device, or on the basis of which such parameter values for the modification can be formed. For example, parameter sets may be stored on a memory element of a token, which are then transferred to the respective devices to be configured and applied there, so that the automation system does not need to have this data (e.g. IP address of an update server) already available.

Depending on the embodiment, it may be possible to reset the modified parameters, e.g. the connection data, as soon as the local access token is no longer detected, for example as soon as a physically connected token is removed from the interface or a wirelessly connected token is deactivated or removed from the range of the reading device of the interface. In this way, a temporary configuration of connection data and similar parameters can be performed by a local user in a simple way, whilst also ensuring that the secure state is subsequently restored.

Modified parameters of the control device may also be reset after a predetermined time period has elapsed since the parameter was changed, and/or after a predetermined time period has elapsed since the last detection of the access token. This ensures that even if an access token remains connected by mistake and is forgotten, for example, in the interface, the secured connection configuration of the automation system is set once again after a certain time period.

It may also be provided that a local access token must be authenticated at the interface first before modifying the control device parameters, in order to prevent any unauthorized access to the configuration of security-related modules and/or in order to differentiate between different access tokens and their functions. This means that a parameter change can be prevented if the authentication fails; in this case, the secure connection configuration preferably remains unchanged and continues to prevent any external access from taking place.

Changing the control device parameters may comprise various functions, such as assigning an IP address for the control device, defining filter rules for received and/or sent packet data, or changing access permissions for the control device, such as changing firewall rules.

An automation system is also proposed, which comprises a control device for controlling one or more automation devices, an interface which is configured to detect a local access token; a configurable connection from the control device to at least one network; and an access module connected to the interface and the control device, which is configured to execute the process steps as described above, individually or in combination.

The interface through which the local access token is detected may comprise a wired interface or a wireless interface. The system may also comprise a local access token, such as a USB memory element, a flash memory card, an active or passive RFID tag, an NFC tag, a mobile device, or a smart card.

A processing unit according to the disclosure, for example a control device of a production machine or robot unit, is configured, in particular by software means, for implementing a method according to the disclosure.

The implementation of a method according to the disclosure in the form of a computer program or computer program product with program code for carrying out all process steps is also advantageous, since this results in particularly low costs, especially if an executing control unit is also used for further tasks and is therefore already present. Suitable data carriers for providing the computer program are, in particular, magnetic, optical and electrical storage devices, such as hard disks, flash memories, EEPROMs, DVDs, and many more. A program download over computer networks (internet, intranet, etc.) is also possible.

Further advantages and embodiments of the disclosure are derived from the description and the enclosed drawing.

It goes without saying that the aforementioned features and those yet to be explained below can be applied not only in the corresponding specified combination, but also in other combinations or in isolation, without departing from the scope of the present disclosure.

BRIEF DESCRIPTION OF THE DRAWINGS

The disclosure is illustrated schematically in the drawing by reference to exemplary embodiments and is described in detail in the following with reference to the drawing.

In the drawings.

DETAILED DESCRIPTION

Figure 1:
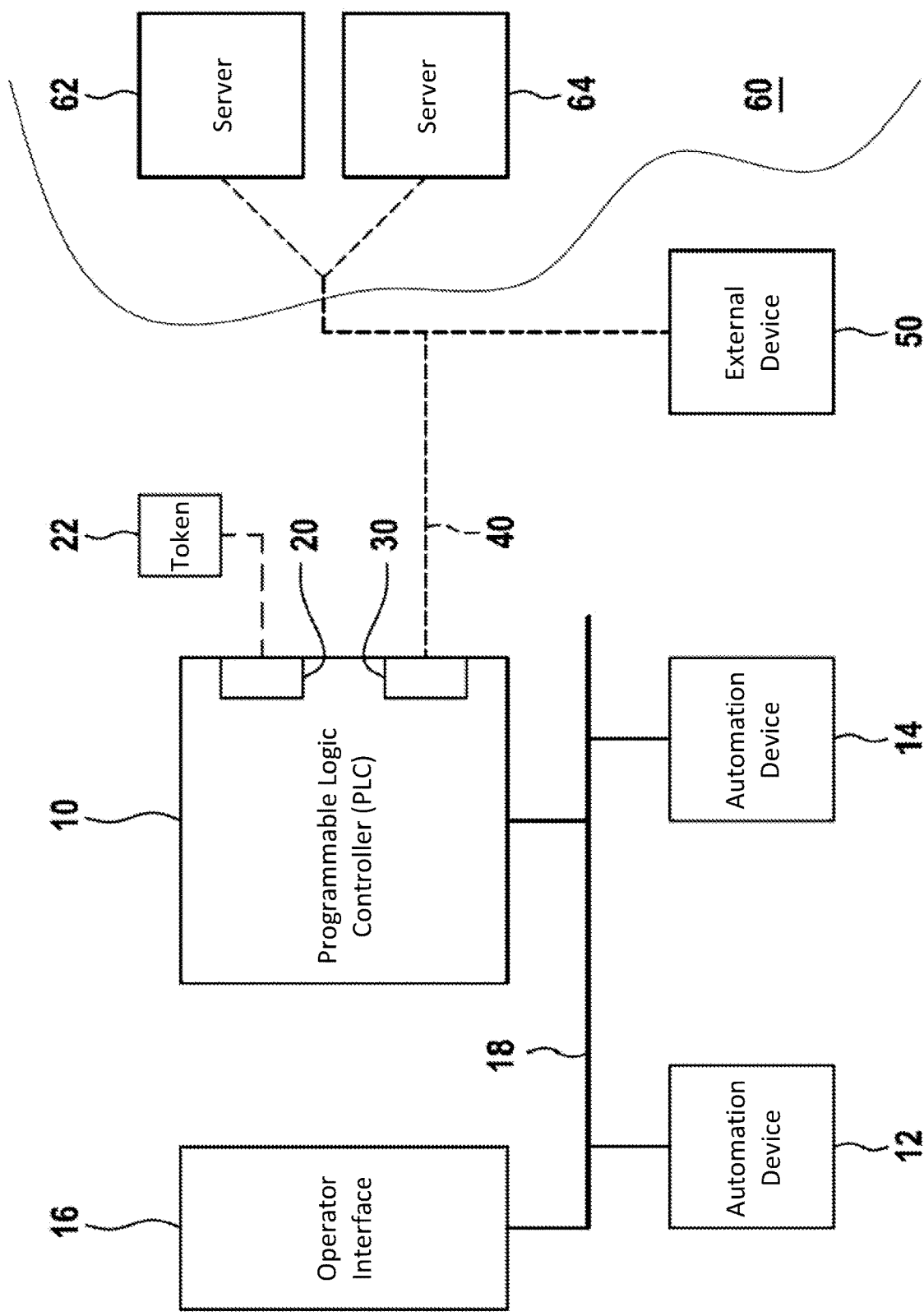
FIG. 1 shows an example automation system according to the present disclosure.

FIG. 1 shows an automation system with a control device 10, which can have a configurable connection 40 to an external network 60. The control device is connected via a bus system 18 to two automation devices 12 and 14, which can be automatic production machines or actuators, for example, and are controlled by the control device 10.

Such systems are usually secured against access to and from external sources, i.e. to another network 60 such as a local network, an intranet or the internet, for example, by appropriate firewall rules such as rules for packet filtering. There are a wide variety of common field buses and associated protocols, via which the connections within the automation system can be configured in a known manner, such as SERCOS (Serial REaltime COmmunication System), Ether-CAT, Modbus TCP, PROFINET, TFTP and others. This means that in principle, an automation device such as a robot arm can be provided directly with appropriate interfaces for a network connection and directly controlled by a suitable control device, which can also be integrated with the automation device. However, it is also possible that, as in the example above, a field bus 18 is used to control a plurality of automation devices 12, 14, i.e. a plurality of robot arms at the same time. For this purpose, a programmable logic controller (PLC) 10 can be used and also connected to the field bus, or alternatively, a PC-controller. Other sensors or automation devices can also be used as desired. The automation devices and bus systems used can be selected as suitable for the present disclosure without restriction, provided a control device 10 is present which enables a single or a plurality of automation devices and/or the entire bus system to make a connection 40 to another network 60 via a corresponding communication interface 30. In this case, a suitable network topology can also be selected for the exemplary bus system, such as a ring topology or a star topology.

A wireless or wired interface 20, which is provided in the control device 10 or connected thereto, enables the detection of a local access token 22 if the latter is connected to the interface 20 or is activated or detectable within its range. Using the configurable network connection 40, the control device can be connected to external networks and devices, servers 62, 64, etc. located therein, or can be directly addressed, for example by an external device 50, such as a portable computer used for maintenance. Optionally, an operator interface 16 (HMI, human machine interface) may be available on the control device, which can alternatively also be directly connected to the bus system 18 and is used to allow interaction with the system by a user.

Figure 2:
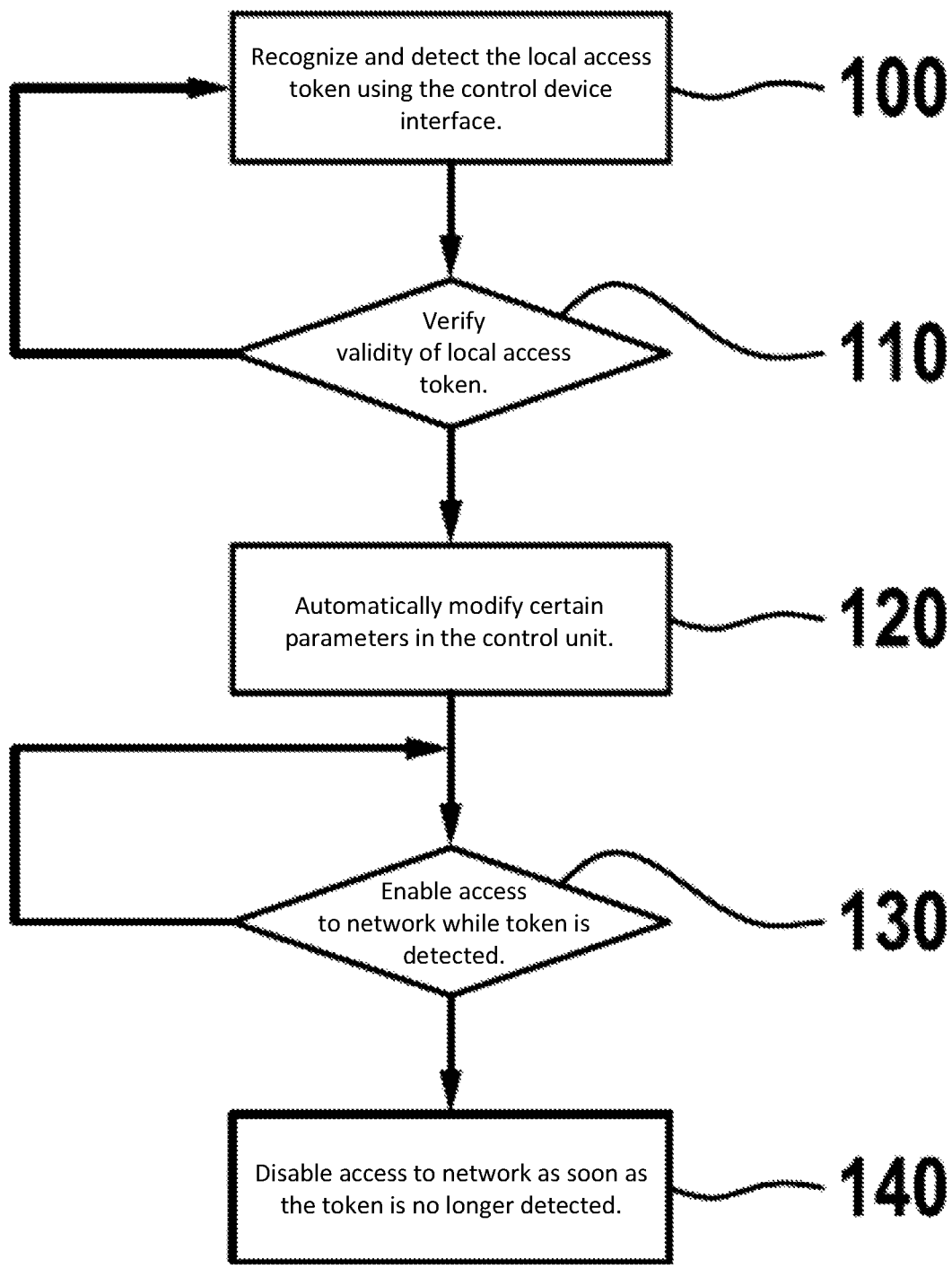
FIG. 2 shows an exemplary processing sequence according to a first embodiment.

FIG. 2 shows an example sequence of a method according to the disclosure, in which access to a field bus device is facilitated.

As the initial state in this embodiment it should be assumed that connecting the field bus device to an external network 60 such as an intranet or the Internet is at least partially restricted. Accessing configuration profiles during normal operation is often not possible. In order to be able to configure or maintain or otherwise modify settings of at least one field bus device, a local access token 22 can now be used. Such an access token can be a physical token that can be detected via the interface 20 of the control device 10. This can be a wireless or wired interface. Once the local access token is recognized and detected using the control device interface in step 100, its validity can first be verified or authenticated in step 110, and then, in step 120, certain parameters can be automatically modified in the control unit. In particular, these can be parameters that allow access from a network or to a network that was previously prevented. For this purpose, for example, firewall rules for providing machine access protection can be modified. After the recognition of the access token, predefined rules or parameters that determine these rules are thus modified in the control device, so that access to the subordinate field bus network is then activated via suitable protocols that was previously not possible.

Now the control device and the field bus device 12, 14 can be accessed externally, e.g. via a device 50 integrated in the network for maintenance, via a local user interface on the device 16 or via an intranet or internet connection 40 according to the modified rules, so that suitable configurations and settings can be modified. While the access token 22 is detected locally, the further modification of the configuration does not necessarily have to be initiated by a local device or user, but can be carried out remotely. In a possible embodiment, access to the network is enabled in step 130 as long as the access token 22 is actively detected, e.g. as long as a corresponding USB stick is plugged into the interface 20 or an RFID token is within range of the reader 20, and access is disabled in step 140 as soon as the access token is no longer detectable, i.e. it has been removed by the user and the token 22 detection check produces a negative result. Preferably, in this step 140 the parameters, in this case the firewall rules for connecting to another network 60, can then be reset to the values set by the access token 22 before the parameter change. For this purpose, it may be provided that the parameters are first read out and stored before they are modified, and after removal or deactivation of the access token are read out from this memory location and applied again. Default settings for one or more situations can also be stored, which are accessed when the parameters are reset.

Figure 3:
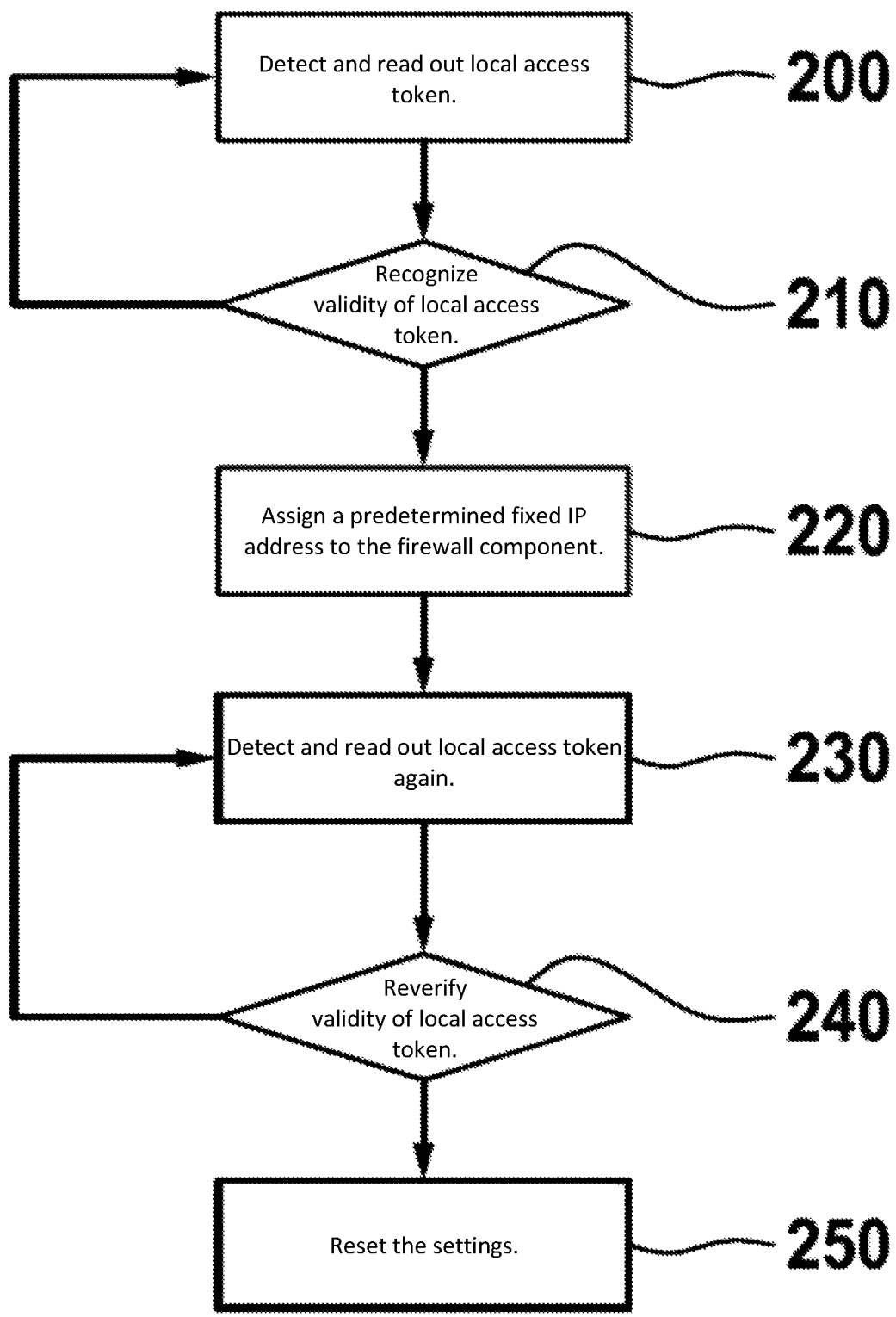
FIG. 3 shows an exemplary processing sequence according to a second embodiment.

In a further exemplary embodiment, an access token 22 can be used to open a firewall temporarily for external access. A corresponding method is explained in relation to FIG. 3, where a flow diagram for the method is shown. Such a firewall is usually inserted between two network interfaces and filters the data intended for the respective subnetwork (bridging firewall) on the basis of e.g. MAC addresses. For this forwarding between the two networks, the firewall does not require its own IP address for a higher layer during active operation, so that it cannot be directly addressed in the external network and is therefore "invisible" or transparent. In this way, the security of an automation system or automation device is further increased, since in this case it is not possible to manipulate the firewall rules externally. However, for administrative tasks from the network, an IP address must therefore be temporarily assigned to the transparent firewall.

As in the first exemplary embodiment, a local access token can be used for this configuration of connection parameters of the control device 10 or firewall, which can be detected and read out in step 200 by a corresponding interface 20 of the control device or an interface connected directly or indirectly thereto. For example, an NFC tag can be used as a token 22, which is brought into the range of an NFC reader interface 20 in the control device. Once the token has been recognized as valid in step 210 and optionally authenticated, the firewall component can be assigned a predetermined fixed IP address in step 220, which may be stored in the device 10, for example. Alternatively, settings can also be modified as parameters to allow the device to be assigned a dynamic IP address on the network 60. The control device or the transparent firewall can then be addressed via this IP address in the network and configured or maintained as usual.

After the maintenance procedures are completed, the user can bring the token 22 into the range of the reader 20 a second time, where it is then detected again in step 230 and optionally reverified for its validity in step 240. If the token is recognized as valid, or authenticated, the control device 10 can then cause the resetting of the settings in step 250, i.e. in this case, the removal of the IP address assignment. The firewall component can thereafter no longer be addressed and the system is securely closed off again.

The local access token 22 should be configured in all variants for use with the respective interface intended and should therefore be designed as a counterpart. For example, the interface 20 in the control device can be a USB interface, wherein the access token 22 can be a USB memory element such as a USB-stick or a mobile device with an associated USB interface; alternatively, the interface can be an RFID reader and the access token can comprise, for example, an active or passive RFID transponder chip or an RFID tag. Likewise, all other suitable wireless and wired interfaces in the near field are possible, in particular Bluetooth transmitters and receivers; a different memory element such as an SD memory card with a suitable reader; an infrared receiver with an associated infrared source for data transmission, e.g. according to IrDA (Infrared Data Association) standards; an NFC (near field communication) reader with an NFC tag; any known or specifically configured connector elements for digital or analog signal transmission at least from the access token to an interface; a mobile device that can implement a software-based token function and has corresponding interfaces such as Bluetooth, WLAN, NFC or others, with which it can address the appropriate interface in the control device; and many others.

The alternative which is chosen may depend, for example, on the interfaces already in place, but also on requirements such as range, required data transfer rates and other parameters. For example, for a production plant to which direct access is difficult, a wireless technology with a relatively longer range, such as RFID or Bluetooth, can be useful in the local access token, while in a device with easy accessibility and existing USB connection, the use of this interface for a local access token is recommended, but not mandatory. An NFC tag with a low data transfer rate and a short range of a few centimeters can also be preferable purely as a switching element for access without further data transmission, while if the transmission of larger amounts of data or variable parameters to the device is desired, more complex devices with corresponding interfaces may be preferable. A plurality of interfaces may also be provided in a control device and/or in an access token at the same time, for example, in order to be able to use a single access token for several devices, or in order to select a specific configuration profile or a specific setting option by selecting the type of access token or interface for a device, e.g. by providing a plurality of digital inputs, at each of which an access token triggers different configuration functions.

This means that the local access token itself can transmit further data to the interface, which is stored, for example, in a memory element integrated therein or connected thereto, or it can also only be used for simple recognition without further data transmission, so that the mere detection of the token as such triggers a change of parameters specified and stored in the control device accordingly. The additional data may be used for different purposes. For example, a token could contain data used to authenticate the token, so that only a valid access token can modify the connection parameters. Such authentication data could be, for example, secret or public cryptographic keys on the token and in the control device, or a certificate stored on the token. The control device can then be configured in such a way that it only triggers the parameter change in the event of a valid test. If other data such as parameter values are also stored on the access token, these could also be protected and/or encrypted so that only one device has access to the parameter values, which has the corresponding key.

Even without any other authentication measures, a control device 10 can first check whether the recognized token is valid, e.g. using stored identification data such as a unique identification code and data records appropriately stored in the control device. If the access token has in fact been detected but is not intended to be used to configure the relevant control device, access can be aborted and an optional warning signal issued.

For example, the settings that are made in response to the detection of a valid access token can be stored locally in the corresponding device. For example, a predefined IP address can be stored, or one or more predefined rule sets for filter mechanisms such as a firewall, and when the access token is detected, the corresponding parameters are replaced by these stored parameters and settings. In addition or alternatively, it is possible that when the token is detected or directly thereafter data are transferred, which at least partially comprise these parameters and configuration settings. Thus, for example, one or more parameters could be stored in a memory element of the token, which are transferred to the control device 10 via the interface 20 after detection and used for modifying the parameters.

It is also possible that a plurality of different settings, parameters, or configurations are stored as options in a device 10, 12, 14, and one of these options is then selected based on the detection of a particular token. The detection can take place without further transmission of data, e.g. in such a way that a first configuration option is selected each time an access token is detected on a first interface (e.g. RFID) and a second configuration option is selected each time a token is detected on a second interface (e.g. USB). It is also possible that in the course of the communication the token transmits data elements during detection, which then enable the selection of the correct parameter set in the device from a memory or a database. In this way, for example, different tokens can be issued to persons with different permissions, which can then be used for different maintenance purposes.

In other combinable embodiments, more complex instructions may be stored in the control device and/or token. For example, after configuration of the connection parameters, if an access token is present, it could be specified that the control device sends a maintenance request as a message to an external server, so that maintenance or updating can be initiated from there automatically or by an administrator. Likewise, predefined network addresses could also be stored, such as an IP address or a URL, from which the control device can automatically request or load files for updating or other data after the connection parameters have been configured, so as to then apply them locally on the control device or on other devices connected thereto. Furthermore, commands for executing programs on the control device or devices connected thereto could be triggered by the access token, so that, for example, after modifying the access parameters an appropriate maintenance application is opened automatically on a control element, to which there is otherwise no access.

In a corresponding bus configuration, for example, a set of parameters can also be stored in a device designated as the master and it can be provided that when the access token is detected, these or other parameters are forwarded to the corresponding slave devices 12, 14. A similar design is also possible in a ring topology, so that changing the configuration of an element in the network will also lead to a change in the remaining elements, while the detection of the token is only required on one element of the ring.

Conversely, in addition to setting parameters that allow access to an external network, such as the assignment of an IP address, further settings can be made to prevent access to the underlying layers. For example, when an access token is detected in the example of FIG. 2, an IP address could be assigned, which then allows the firewall element to be configured externally, while communication in connected network ranges of the underlying field bus network is prevented for this period.

Depending on the requirement, in this case it may be specified that the modified configuration settings (e.g. the modified firewall rules from FIG. 2 or the assigned IP address for the firewall module from FIG. 3) remain active until the access token is removed again, thus for example until a corresponding element such as a USB stick is removed from the interface, or in the case of a wireless interface such as NFC, it is no longer located within the necessary range. This ensures that the corresponding parameters can only actually be changed when the local access token is applied and external access to the device remotely is securely revoked. For example, even if a wireless interface is used, a mechanical bracket could be provided in which an NFC token device is inserted or held as long as the device configuration is desired.

Alternatively or in addition, it may also be provided that modified configuration settings, parameters and similar items for controlling the network connection remain valid for a predetermined period after a valid access token has been detected, and after this specified time period has expired the original settings or parameters are restored and the device or network is thus secured against other networks again. In this way, it is not absolutely necessary, for example, that an NFC tag used as a token 22 is constantly within range of the access device 20 while the configuration is being performed. At the same time, specifying a time period after which the previous settings are restored ensures that insecure configurations are not accidentally preserved on the device, which could constitute a risk factor.

Optionally, it is possible to check once again whether the access token is within range or present on the interface within the predetermined time period or at the end of the time period, and if this is the case, the time period can be restarted and the return to the previous settings only performed after a repeated expiry and a negative test result. This avoids a constant switching back and forth between configurations if the corresponding token is only briefly disconnected or not detectable. Similarly, in such a case it is conceivable to define a minimum time during which the token must be initially detectable at the interface for modifying the parameters in order, for example, to prevent accidental activations by long-range wireless tokens. For example, it could be provided that a token must be detectable for at least 5 seconds and/or during access must not be removed for longer than 3 seconds (or any other time period), in order to maintain the network access active. Conversely, an expiration period, preferably with a sufficiently long duration (e.g. minutes or hours), can also be valid when the token is inserted/detected in order to close off access to the device again, even if the token remains inserted accidentally.

Alternatively or in addition to the measures mentioned, such as the expiry of a timer or the resetting of the configuration after the access token has been removed, it can also be provided that the parameters are reset by communication externally. For example, it is conceivable that the local access token is detected (steps 100, 200, 300 and 110, 210, 310), the connection parameters are then modified as described and maintenance or updating of components takes place via the now open network connection 40. Once all the necessary data and commands have been exchanged over the network connection, an instruction to reset the connection parameters to the previous value could be sent from the remote maintenance system and received in the control device, so that even without removing the token or the expiry of a time period the potentially insecure external connection is prevented again. Of course, the different variants for resetting the parameters can also be combined with one another, so that, for example, both removing the token from the interface and an external communication can cause a reset, optionally also in conjunction with a timer.

Figure 4:
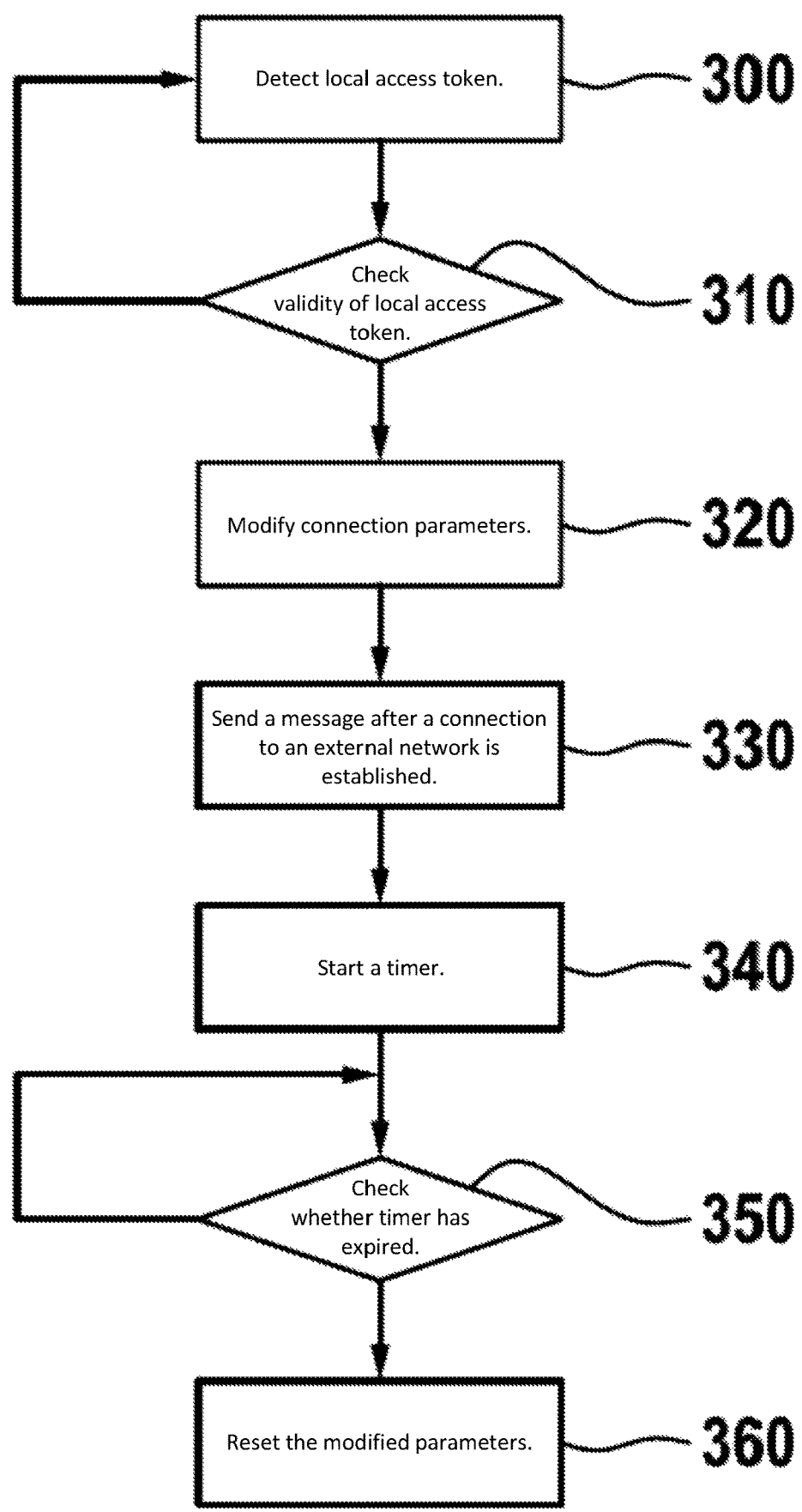
FIG. 4 shows a further exemplary processing sequence according to a third embodiment.

FIG. 4 shows another example of a process sequence according to the disclosure, where again in steps 300 and 310 the access token is first detected and checked for validity and, if the test is successful, the connection parameters are modified in step 320. After a connection to an external network is established by means of an open connection, in step 330 a message can then be sent, for example, to initiate the downloading of update data or to indicate the opened connection to a remote administrator. In addition, in step 340 (which can also take place immediately upon changing the parameters or upon detecting the valid token) a timer can be started, which is set to a predefined or configurable time period. In step 350, a check is made as to whether the timer has expired and as soon as this is the case, in step 360 the modified parameters are reset again and the system is thus secured again. The steps shown here as examples can of course also be used in the previous examples from FIGS. 2 and 3 or combined in other ways.

Another option is that once the access token is detected, a further interaction with the device or token is necessary, e.g. confirmation of the token recognition via a keyboard or touch display or similar input devices on the control device, to ensure that, in particular when using wireless interfaces, only the desired device is configured. Control elements can also be provided on the access point itself, e.g. to activate the interface (e.g. activate the RFID tag or switch on the Bluetooth transmitter), or to initiate a detection by suitable readers, for example in the form of a handshake protocol.

According to a further design variant, the detection of an access token can cause switching from the current configuration state into another configuration state and vice versa. Thus, as described in FIG. 3, a first detection 200 of an access token could cause a parameter to be modified (step 220), for example the IP address could be assigned, and if the access token is detected again (230) the parameter is reset, step 250. In between, the access token 22 does not need to, or should not, be detected. For this purpose, as described above a control element, for example, may be present on the access token, which is activated by the user at the relevant times. The access token thus switches back and forth between the predefined configuration states on each detection, wherein more than two states can also be provided which are passed through in sequence, for example.

An access token can optionally also be provided, however, which also causes a permanent or long-term change in the configuration settings after a single detection, so that after the token is removed from the interface no reset of the setting parameters is performed, or the parameters are only modified again when a further token, possibly a different token, is detected.

In general, a plurality of configurations or parameter changes can be triggered by a detection of a local access token as described. Among other things, modification of parameters can comprise changing filter rules for packet data traffic, assigning network addresses to a device, executing commands, program modules, or sending messages, retrieving data from a remote server, opening ports in a firewall, and many others which enable and/or prevent communication with a desired network.

A further advantage of the presented configuration methods is that depending on the design, the device to be configured does not need to have its own control elements. It may be sufficient if an interface or a reader is available for a suitable access token, while all further settings can be implemented via externally connected devices or remotely over a network. In this way, control elements for operational functions can be available, but they do have to be configured for more detailed configuration tasks. Both are particularly advantageous for fully automated industrial environments.

The term automation system for the purposes of the present disclosure covers all sensors, actuators, stationary and mobile robots, partially automated and automated production machines such as printing machines, processing machines and others, also in combination with their respective control devices, memory elements, databases and networks.

It goes without saying that the described embodiments are only cited as examples and, in particular, the different options and alternatives can also be combined in different ways. Thus, all the steps and configurations mentioned above are also transferable to the modification of other parameters, can be combined with each other in other ways, and optional steps can be omitted or added. The exemplary embodiments can be transferred to all described alternatives, i.e. for example to other network elements, to one of the other interface technologies mentioned for the access token, and to any devices or systems that have such an access control, even if the disclosure has been described in relation to automation systems and manufacturing environments.

What is claimed is:

1. A method for configuring a control device of an automation system, the control device being configured to operate at least one automation device of the automation system to perform a task, the method comprising:
   detecting a local access token via an interface of the control device;
   temporarily modifying, in response to detecting the local access token, at least one parameter of the control device that configures a data connection of the control device; and
   while the at least one parameter is modified, at least one of (i) configuring, using an external device, the control device via the data connection and (ii) performing, using the external device, a maintenance procedure on the control device via the data connection; and
   resetting the modified at least one parameter in response to one of (i) the local access token no longer being detected or (ii) a predetermined time period having elapsed since the at least one parameter was modified.

2. The method according to claim 1, the modifying the at least one parameter comprising:
   changing the at least one parameter from a first value that prevents communication between the control device and a network to a second value that allows the communication between the control device and the network.

3. The method according to claim 1 further comprising:
   receiving at least one data element from the local access token; and
   selecting at least one stored value for the at least one parameter based on the received data element, the at least one parameter being modified using the selected at least one stored value.

4. The method according to claim 1 further comprising:
   receiving at least one value for the at least one parameter from the local access token; and
   modifying the at least one parameter based on the received at least one value.

5. The method according to claim 1, the resetting further comprising:
   resetting the modified at least one parameter in response to the local access token no longer being detected; and
   resetting the modified at least one parameter in response to the predetermined time period having elapsed since the at least one parameter was changed.

6. The method according to claim 1 further comprising:
performing an authentication of the local access token, the least one parameter being left unmodified in response to the authentication failing.

7. The method according to claim 1, the modifying the at least one parameter comprising at least one of:
assigning an IP address for the control device;
defining filter rules for at least one of received packet data and sent packet data; and
changing access permissions for the control device.

8. An automation system comprising:
at least one automation device configured to perform a task;
a control device configured to operate the at least one automation device to perform the task;
an interface configured to detect a local access token;
a configurable connection between the control device and at least one network;
an access module connected to the interface and the control device, the access module being configured to (i) detect the local access token via the interface, (ii) temporarily modify, in response to detecting the local access token, at least one parameter of the control device that configures the configurable connection between the control device and the at least one network, and (iii) reset the modified at least one parameter in response to one of (i) the local access token is no longer being detected or (ii) a predetermined time period having elapsed since the at least one parameter was modified; and
an external device configured to, while the at least one parameter is modified, at least one of (i) configure the control device via the data connection and (ii) perform a maintenance procedure on the control device via the data connection.

9. The automation system according to claim 8, wherein the interface is one of a wired interface and a wireless interface.

10. The automation system according to claim 8, further comprising:
the local access token configured to one of unidirectionally communicate with the interface and bidirectionally communicate with the interface, the local access token being one of (i) a USB memory element, (ii) a flash memory card, (iii) an active RFID tag, (iv) a passive RFID tag, (v) an NFC tag, (vi) a mobile device, and (vii) a smart card.

11. A processing unit for configuring a control device of an automation system, the control device being configured to operate at least one automation device of the automation system to perform a task, the processing unit configured to:
detect a local access token via an interface of the control device; and
temporarily modify, in response to detecting the local access token, at least one parameter of the control device that configures a data connection of the control device; and
reset the modified at least one parameter in response to one of (i) the local access token is no longer being detected or (ii) a predetermined time period having elapsed since the at least one parameter was modified,
wherein, while the at least one parameter is modified, an external device at least one of (i) configures the control device via the data connection and (ii) performs a maintenance procedure on the control device via the data connection.

12. The processing unit according to claim 11, wherein the processing unit is configured to execute a computer program to perform the detection of the local access token and the modification of the at least one parameter.

13. The processing unit according to claim 11, wherein the computer program is stored on a machine-readable storage medium.

* * * * *